United States Patent Office 3,357,949
Patented Dec. 12, 1967

3,357,949
POLYMERIC ORGANIC BORON-NITROGEN-SULFUR COMPOUNDS
Elmar-Manfred Horn, Aachen, and Hans Niederprum, Monnheim, Germany, assignors to Farbenfabriken Bayer Aktiengesellschaft, Leverkusen, Germany, a German corporation
No Drawing. Filed May 1, 1964, Ser. No. 365,563
Claims priority, application Germany, May 9, 1963, F 39,692
30 Claims. (Cl. 260—46.5)

ABSTRACT OF THE DISCLOSURE

Production of thermally stable polymeric organic boron-nitrogen-sulfur compounds by mixing, e.g., at 0–600° C., a borane amine of the formula $$R \rightarrow BH_3$$

in which R is primary, secondary or tertiary amine with one or more thiocyanates of the formula $$R^1(SCN)_m$$

in which $R^1$ is a hydrocarbon radical, optionally containing silicon, phosphorus, tin, oxygen, halogen and/or nitrogen, and $m$ is an integer from 1 to 6, and optionally with one or more nitriles of the formula $$R^2(CN)_n$$

in which $R^2$ is a hydrocarbon radical, optionally containing halogen and/or nitrogen.

---

The present invention relates to polymeric organic boron-nitrogen-sulfur compounds and a process for the production thereof.

It is an object of the present invention to provide novel polymeric organic boron-nitrogen-sulfur compounds. It is another object of the present invention to provide a process for the production of polymeric organic boron-nitrogen-sulfur compounds. Still further objects of the present invention shall become apparent as the description proceeds.

The process for the production of the polymeric organic boron-nitrogen-sulfur compounds is characterized in that borazanes of the general formula $$R \rightarrow BH_3$$

wherein R can be a primary, secondary or tertiary amine, are reacted at temperatures between 0° C. and 600° C. with thiocyanates of the general formula $$R^1(SCN)_m$$

possibly in the presence of nitriles of the general formula $$R^2(CN)_n$$

wherein $R^1$ denotes a hydrocarbon radical which may contain silicon, phosphorus, tin and/or oxygen atoms, $R^2$ denotes a hydrocarbon radical, and $m$ and $n$ are integers.

It has been found that organic, organo-silicon, organo-phosphorus and organo-tin thiocyanates, mixtures of the said thiocyanates, and mixtures which may consist of one or more of the said thiocyanates and one or more nitriles, can be reacted with borazanes, with splitting off of the amine component R of the borazane $$R \rightarrow BH_3$$

and with splitting off of hydrogen, to form high-molecular organic polymers containing boron, nitrogen and sulfur. The proportions of starting substances are preferably selected in such a manner that one mol of borazane is used per mol of thiocyanate group. When starting from thiocyanate/nitrile mixtures, one mol of borazane is preferably used for every mol of thiocyanate group as well as for every mol of nitrile group; however, the process according to the invention can also be carried out with other molar proportions of borazane and thiocyanate, or thiocyanate and nitrile. For example, when using olefinically or acetylenically unsaturated thiocyanates and/or nitriles, it is in some cases of advantage to choose a higher molecular ratio, referred to the borazane employed.

Dependent upon the conditions of production and the thiocyanates or thiocyanate/nitrile mixtures used, there are obtained resins, pastes or oils which chiefly exhibit a surprising thermal stability and can be used as plant protectives, as intermediates, as additives to motor fuels and lubricants, and for the production of polymers with neutron-absorbing properties.

For the present process, borazanes are used, the amino components of which can be primary, secondary or tertiary $C_1$–$C_{18}$-alkyl, cycloalkyl or aryl amines, mixed alkyl-cycloalkyl-aryl amines, or possibly alkylated heterocyclic amines, preferably pyridines and piperidines.

Because they are easily obtainable, N-triorgano-borazanes are preferably used, for example, N-trimethyl-borazane, N-triethyl-borazane, N-tripropyl-borazane, N-diethyl-N-butyl-borazane, N-dimethyl-N-cyclohexyl-borazane, N-dimethyl-N-phenyl-borazane or the pyridine-borine; however, other borazanes, such as e.g. N-diethyl-borazane or N-laurylborazane can also be used as starting substances.

Mono- or polythiocyanates of the general formula $$R_p{}^3{-}(Z{-}SCN)_m$$

can be used. In this formula $m$ denotes an integer preferably from 1 to 6, $p$ denotes an integer from 0 to 1. If $p$ is 0, Z has the meaning of $R^4$. $R^4$ denotes alkyl, alkenyl, alkinyl, cycloalkyl or aryl groups or alkyl-, cycloalkyl-, aryl-alkoxy-, aroxy-, halogen-, primary, secondary or tertiary amine, mono- or polysubstituted derivatives thereof. If $p$ is 1, Z denotes alkylene, oxyalkylene, cycloalkylene, cyclooxyalkylene, arylene or oxyarylene groups with 1 to 6 carbon atoms. $R^3$ has the meaning of

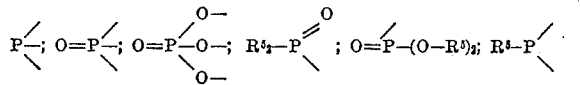

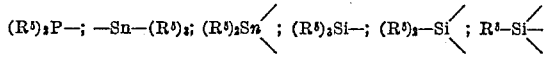

or with $m(Z{-}SCN)$-groups substituted disiloxane or polysiloxane groups. $R^5$ denotes hydrogen, alkyl, alkenyl, alkinyl, cycloalkyl, aralkyl aryl, alkoxy, aryloxy-groups.

When organo-silicon, organo-phosphorus or organo-tin mono- or polythiocyanates are used, the silicon, phosphorus or tin atom in these compounds is always separated from the thiocyanate group either by at least one carbon atom, or by one oxygen atom and at least one carbon atom.

As examples of suitable monothiocyanates there may be mentioned: possibly substituted aliphatic monothiocyanates, such as methylthiocyanate, ethylthiocyanate, n- and i-propylthiocyanate, n-, i- and tert.-butylthiocyanate, hexylthiocyanate, octylthiocyanate, dodecylthiocyanate, hexadecylthiocyanate, octadecylthiocyanate, methoxymethylthiocyanate, benzylthiocyanate, 4-chloro-benzylthiocyanate, 2-fluoro-ethylthiocyanate, 2-bromo-1-methyl-propylthiocyanate, 5,5,5-trifluoro-pentyl-thiocyanate, 2-methyl-2-thiocyanatobutane, 3,5,5-trimethyl-hexyl-thiocyanate, allyl-thiocyanate, 3-chloro-allyl-thiocyanate, 3-ethyl-allyl-thiocyanate, oleylthiocyanate, 2-thiocyanato-butadiene-(1,3); possibly nuclear-substituted cyclohexylthiocyanates, such as cyclohexylthiocyanate and 4-methyl-cyclohexyl-thiocyanate; possibly nuclear-substituted aromatic thiocyanates, such as phenylthiocyanate, 1-naphthyl-thiocyanate, 3-methylphenyl-thiocyanate or 4-dimethylamino-phenyl-thiocyanate.

Examples of compounds with several thiocyanate groups in the molecule are:

1,4-dithiocyanto-butene-(2),
2,3-dibromo-1,4-dithiocyanato-butane,
bis(2-thiocyanto-ethoxy)-methane,
di-(2,2'-thiocyanto-ethyl) ether
and di-(4,4'-thiocyanto-n-butyl) ether.

The mono- or polythiocyanates containing silicon, or silicon and oxygen are either silane derivatives, such as for example, trimethyl-thiocyanto-methylsilane,
ethyl-dimethyl-thiocyanto-methylsilane,
phenyl-dimethyl-thiocyanto-methylsilane,
methoxy-dimethyl-thiocyanto-methylsilane,
ethoxy-methyl-ethyl-thiocyanto-methylsilane,
phenoxy-diphenyl-thiocyanto-methylsilane,
trimethyl-(p-thiocyanto-phenyl)-silane,
trimethyl-(α-thiocyanto-ethyl)-silane,
trimethyl-(γ-thiocyanto-propyl)-silane,
bis-(thiocyanto-methyl)-dimethylsilane,
triphenyl-(γ-thiocyanto-propyl)-silane
or triethyl-(2-thiocyanto-ethoxy)-silane, or they are open-chain or cyclic poly-siloxanes which contain one or more thiocyanate groups in the end position or side position, whereby in these siloxane derivatives, as also in the above-mentioned silane derivatives, the silicon atom is always separated from the thiocyanate group by at least one carbon atom, or by one oxygen atom and at least one carbon atom. Examples of siloxane derivatives which can be used for the process according to the invention are:

1,3-bis-(thiocyanto-methyl)-1,1,3,3-tetramethyl-disiloxane,
heptamethyl-thiocyanto-methyl-cyclo-tertasiloxane,
trimethyl-tris-(thiocyanto-methyl)-cyclo-trisiloxane
and the α,ω-bis-(thiocyanto-methyl)-polymethyl-polysiloxanes.

As examples of organo-phosphorous- or organo-tin thiocyanates there may be mentioned:
tris-(thiocyanto-methyl)-phosphine,
tris-(p-thiocayanto-phenyl)-phosphine oxide,
tris-(p-thiocyanato-phenyl)-phosphate,
diethyl-thiocyanatomethyl-phosphine oxide,
p-thiocayanto-phenyl-phosphonic acid dimethyl ester,
tris-(β-thiocyanato-ethyl)-phosphate
or triphenyl-(γ-thiocyanato-propyl)-tin,
tripropyl-(γ-thiocyanato-propyl)-tin,
dibutyl-bis-(γ-thiocyanato-propyl)-tin
or triphenyl-(β-thiocyanato-ethoxy)-tin.

A process for the production of polymeric organic boron-nitrogen compounds has already been developed, which consists in reacting borazanes with nitriles. It has now been found that also mixtures which consist of organic, organo-silicon, -phosphorus and/or -tin thiocyanates on the one hand and nitriles on the other hand are suitable for the reaction on which the process according to the invention is based; thereby organic mono- or polycyanides of the general formula $$R^2(CN)_n$$

can be used, wherein $R^2$ is an aliphatic, cycloalphatic or aromatic radical which may be mono- or poly-substituted by alkyl, cycloalkyl, aryl, alkoxy, aroxy, primary, secondary or tertiary amino groups and/or halogen atoms, and $n$ is an integer, preferably from 1 to 6.

Examples of monoitriles are: acetonitrile, propionitrile, butyronitrile, the nitriles of octane-, dodecane- and hexane-carboxylic acid, possibly nuclear-substituted hexahydro-benzoic acid nitriles, possibly nuclear-substituted benzonitriles (e.g. benzonitrile and 2-chloro-benzonitrile) and possibly nuclear-substituted naphthaonitriles. Examples of compounds with several nitrile groups in the molecule are: malonic acid dinitrile, glutaric acid dinitrile, adipic acid dinitrile, cyanoform and 1,1,3,3-tetracyano-propane. The organic radical containing one or more nitrile groups may moreover be saturated or aromatically, olefinically or acetylenically unsaturated.

If organic thocyanates or silicon-, phosphorus- or tin-containing organic thiocyanates are used, which are olefinically or acetylenically unsaturated, and/or olefinically or acetylenically unsaturated nitriles such as allyl-thiocyanate, 2-thiocyanto-butadiene-(1,3)-allyl-dimethyl-thiocyanathomethyl-silane, 1,4-dicyano-butane-(2) or 1,1,2,2-tetracyanoethylene, then there usually also occurs, in addition to the reaction of the borazane with the thiocyanate group and, possibly, the reaction of the borazene with the nitrile group, a hydroboration of the double or triple bond which frequently leads to an additional cross-linking of the polymeric organic boron-nitrogen-sulfur compounds.

An additional cross-linking or the polymeric compounds according to the invention which contain boron, nitrogen, sulfur and possibly silicon, phosphorus or tin, can also be achieved by using nitriles and/or thiocyanates which are substituted by primary or secondary amino groups. In this case an additional condensation takes place which proceeds, for example, according to the known scheme

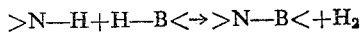

The reactions, forming the basis of the process according to the invention, of borazanes with organic, organo-silicon, -phosphorus and/or -tin thiocyanates, or with mixtures consisting of the said thiocyanates and nitriles, are carried out at temperatures between 0° C. and 600° C., expediently at temperatures above 100° C., whereby it is possible to work under normal pressure, under foreign gas pressure (e.g. under nitrogen pressure) or also under the hydrogen pressure caused by the hydrogen which is split off during the reaction.

Apart from using, for example, olefinically or acetylenically unsaturated thiocyanates or nitriles, a further possibility of influencing the properties of the boron-nitrogen-sulfur compounds produced according to the invention consists in that the thiocyanate component is not employed in the form of a well-defined uniform compound but that any thiocyanate mixtures are used, possibly mixed with one or more nitriles.

The properties of the polymers produced according to the present process can also be modified to a large extent by adopting a specific procedure for their production, for example, (1) mixing the borazane and the thiocyanate and, possibly, the nitrile and subsequently heating to the reaction temperature under normal pressure or increased pressure, or (2) heating one of the starting products to the reaction temperature and then adding the other component or components, for example through a dropping funnel or, when working under pressure, for example by means of a dosage pump, or (3) carrying out the reaction according to the methods mentioned under (1) and (2) in an inert solvent or dispersing agent. For example, hydrocarbons, such as benzene, toluene, xylene, diethylbenzene and trimethylbenzene, or ethers, such as dibutyl ether and dibenzyl ether, can be used for this purpose.

The following examples are given for the purpose of illustrating the invention.

EXAMPLE 1

In an autoclave of 0.9 litre capacity, fitted with stirrer, a mixture consisting of 79.5 g. (0.5 mol) of ethyl-dimethyl-thiocyanatomethyl-silane, 57.5 g. (0.5 mol) of N-triethyl-borazane and 150 ml. of dry benzene is heated at about 200° C. for 1½ hours, whereby the pressure adjusts itself to 21.5 atmospheres. After cooling to room temperature, the final pressure amounts to 3.5 atmospheres. The practically pure hydrogen (identified by gas chromatography) is blown off, the content of the autoclave is transferred to a round flask, the triethylamine which has been split off and the benzene used as solvent are distilled off under normal pressure, residual volatile compounds are removed in a vacuum at temperatures of about 130–140° C., and 86 g. of a brown-coloured oil are obtained, which contains 7.0% of boron, 18.5% of sulfur, 9.0% of nitrogen, 15.4% of silicon and 0.13% of active hydrogen (hydridic-hydrogen, probably directly linked with boron, determined gas-volumetrically by hydrolysis with warm semi-concentrated sulfuric acid).

This oil possesses the following physical constants: $n_D^{20}=1.5300$, $d_{20}^4=1.007$, $\eta_{20°}=98.6$ cp., and is soluble, for example, in benzene, carbon tetrachloride, dioxan, di-n-butyl ether and n-hexane.

Further reactions which are carried out in an autoclave, are summarised in the following Table 1. Therein %$H_a$ denotes content of active hydrogen in percent.

EXAMPLE 6

115 g. (1 mol) of N-triethyl-borazane dissolved in 500 ml. of diethyl-benzene are mixed in a round flask fitted with stirrer, descending condenser, immersed thermometer and dropping funnel, this mixture is heated to about 130° C., 115 g. (1 mol) of n-butyl-thiocyanate are then added dropwise within about 40 minutes, and the separated triethylamine and the bulk of the diethylbenzene used as solvent are finally distilled off under normal pressure. During these operations a total of 2.8 litres (measured at 20.5° C.) of hydrogen evolve (identified by gas chromatography). After removal of the residual volatile components in a vacuum, 123 g. of a yellow oil are obtained, which contains 7.3% of boron, 23.9% of sulfur, 9.3% of nitrogen and 0.28% of $H_a$, and possesses the following physical constants $$n_D^{20}=1.5280,\ d_4^{20}=1.003,\ \eta_{20°}=26.8\ \text{cp.}$$

and is soluble, for example, in benzene, dioxan, n-hexane, di-n-butyl ether and carbon tetrachloride.

EXAMPLE 7

To a solution of 126.5 g. (1.1 mol) of N-triethyl-borazane in 250 ml. of diethylbenzene, heated to about 150° C., are added dropwise, in the apparatus described above, within about 15 minutes, 582 g. of a linear α,ω-bis-(thiocyanato-methyl) - poly-dimethyl-siloxane which, with a thiocyanate content of 9.9 percent by weight of SCN, has the approximate composition

The reaction product is worked up as described above, and 562 g. of a pale yellow oil are obtained which contains 1.7% of boron, 5.15% of sulphur, 2.2% of nitrogen, 32.1% of silicon and 0.31% of active hydrogen. The oil is characterised by the following constants: $n_D^{20}=1.4352$, $d_4^{20}=1.005$, $\eta_{20°}=77.9$ cp. and soluble in e.g. dioxan, hexane, benzene, carbon tetrachloride and di-n-butyl ether.

Further polymers containing boron, nitrogen and sulfur, and obtained by reaction under normal pressure are described in Tables 2 and 3.

TABLE 1

| Ex. | Starting substances ||||
|---|---|---|---|---|
| | Borazane | Thiocyanate | Nitrile | Solvent |
| 2 | $(C_2H_5)_3N.BH_3$, 115 g.=1 mol | $C_2H_5SCN$, 87 g.=1 mol | | |
| 3 | $(C_2H_5)_3N.BH_3$, 60.5 g.=0.525 mol | i-$C_3H_7SCN$, 50.5 g.=0.5 mol | | |
| 4 | $(C_2H_5)_3N.BH_3$, 120.5 g.=1.05 mol | n-$C_4H_9SCN$, 57.5 g.=0.5 mol | Adipicdinitrile, 27 g.=0.25 mol | Benzene, 150 ml. |
| 5 | $(C_2H_5)_3N.BH_3$, 158.1 g.=1⅜ mol | n-$C_4H_9SCN$, 86.3 g.=0.75 mol | 1.4-dicyanobutene-(2), 26.5 g.=0.25 mol. | Diethylbenzene, 150 ml. Do. |

| Ex. | Reaction Conditions || Product obtained |||| Soluble in e.g. |
|---|---|---|---|---|---|---|---|
| | Time | Temp. (° C.) | Amount (g.) | Appearance | Analyses | Physical constants | |
| 2 | 30 min | 160 | 93 | Grey-brown oil | 9.5% B, 17.3% S, 0.76% $H_a$, 14.8% N. | $n_D^{20}=1.5031$, $d_4^{20}=0.980$, $\eta^{20°}=44.7$ cp | Dioxan, benzene, $CCl_4$. |
| 3 | 1 hour | 160–180 | 44 | Dark brown oil | 10.4% B, 25.9% S, 12.9% N, 0.42% $H_a$. | $n_D^{20}=1.5374$, $d_4^{20}=1.036$ | Dioxan, benzene, hexane $CCl_4$. |
| 4 | 1 hour | 170–180 | 98 | Yellowish resin | 10.8% B, 12.0% S, 14.6% N, 0.34% $H_a$. | Turns pale brown in closed tube at 400° C.; no melting or sintering up to 525° C. | Little soluble in hot $CCl_4$. |
| 5 | 45 min | 170 | 135 | Yellow resin | 10.9% B, 15.4% S, 14.3% N, 0.21% $H_a$. | Turns pale brown in closed tube at 450° C.; no melting or sintering up to 525° C. | Dioxan, benzene, dibutyl-ether, $CCl_4$. |

TABLE 2

| Ex. | Starting substances | | | |
|---|---|---|---|---|
| | Borazane | Thiocyanate | Nitrile | Solvent |
| 8 | $(C_2H_5)_3N \cdot BH_3$, 115 g. = 1 mol | n-$C_4H_9SCN$, 57.5 g. = 0.5 mol | $C_6H_5CH_2C\equiv N$, 58.5 g. = 0.5 mol | Diethylbenzene, 500 ml. |
| 9 | $(C_2H_5)_3N \cdot BH_3$, 115 g. = 1 mol | n-$C_4H_9SCN$, 86.3 g. = 0.75 mol | $ClCH_2CH_2C\equiv N$, 22.4 g. = 0.25 mol | Diethylbenzene, 360 ml. |
| 10 | C₅H₅N→BH₃, 46.5 g. = 0.5 mol | Cl—C₆H₄—CH₂—SCN, 91.7 g. = 0.5 mol | | Di-n-butyl ether, 250 ml. |
| 11 | $(C_2H_5)_3N \cdot BH_3$, 126.5 g. = 1.1 mol | $(H_3C)_2N$—C₆H₄—SCN, 17.8 g. = 0.1 mol | $H_3C$—$N(CH_2$—$CH_2C\equiv N)_2$ | Diethylbenzene, 210 ml. |

| Ex. | Reaction Conditions | | Product obtained | | | | Soluble in e.g. |
|---|---|---|---|---|---|---|---|
| | Time | Temp. (° C.) | Amount (g.) | Appearance | Analyses | Physical constants | |
| 8 | 1 hour | 140–160 | 106 | Yellow oil | 8.0% B, 11.4% S, 10.1% N, 0.77% H_a. | $n_D^{20}=1.4675$, $d_4^{20}=1.034$, $\eta_{20°}=723$ cp | Dioxan, benzene, dibutyl-ether, CCl₄. |
| 9 | 40 min | 150–170 | 96 | do | 8.0% B, 18.5% S, 10.4% N, 5.1% Cl, 0.31% H_a. | $n_D^{20}=1.5211$, $d_4^{20}=1.025$, $\eta_{20°}=60.8$ cp | Benzene, dioxane, CCl₄. |
| 10 | 1 hour | 100–150 | 103 | Pale yellow resin | 4.5% B, 14.1% S, 7.3% N, 14.7% Cl, 0.14% H_a. | M.P.=235–237° C | Dioxan, benzene, hexane. |
| 11 | 20 min | 130–160 | 81 | do | 11.8% B, 3.0% S, 22.0% N, 0.47% H_a. | M.P.=135–138° C | Benzene, dioxan, CCl₄. |

TABLE 3

| Ex. | Starting substances | | | |
|---|---|---|---|---|
| | Borazane | Thiocyanate | Nitrile | Solvent |
| 12 | C₆H₅—N(CH₃)₂→BH₃, 148.5 g. = 1.1 mol | 1,3-bis-(thiocyanatomethyl)-1,1,3,3-tetramethyldisiloxane, 69 g. = 0.25 mol | $(CH_3)_2N$—$CH_2$—$CH_2$—$C\equiv N$, 49 g. = 0.5 mol | Diethylbenzene, 250 ml. |
| 13 | $(n-C_4H_9)_3N\to BH_3$, 219 g. = 1.1 mol | C₆H₅—CH₂—SCN, 50.6 g. = 0.4 mol + C₆H₅—SCN, 14.1 g. = 0.1 mol | Naphthyl-C≡N, 76.5 g. = 0.5 mol | Diisoamylether, 200 ml. |
| 14 | $(C_2H_5)_3N\to BH_3$, 190 g. = 1.65 mol | $CH_2=CHCH_2SCN$, 99 g. = 1 mol | | p-Cymol, 250 ml. |
| 15 | $(n-C_3H_7)_2NH \cdot BH_3$, 80.5 g. = 0.5 mol | C₆H₅—CH₂—SCN, 7.5 g. = 0.05 mol | C₆H₅—CH₂—C≡N, 52.7 g. = 0.45 mol | o-Xylene, 800 ml. |

TABLE 3—Continued

| Ex. | Reaction Conditions | | Product obtained | | | | Soluble in e.g. |
|---|---|---|---|---|---|---|---|
| | Time | Temp., (°C.) | Amount (g.) | Appearance | Analyses | Physical constants | |
| 12 | 40 min | 120–140 | 101 | Yellow oil | 4.9% B, 0.29% H$_a$ | $n_D^{20}$=1.5253 | Benzene, dioxan, CCl$_4$. |
| 13 | 1 hour | 125–140 | 160 | Yellow to orange oil. | 5.6% B, 8.2% S, 8.6% N. | $n_D^{20}$=1.6061, $n_4^{20}$=1.2003, $\eta_{20°}$=682.3 cp | Dioxan, benzene, CS$_2$, CCl$_4$. |
| 14 | 15 min | 135–175 | 70 | Yellow resin | 13.1% B, 24.1% S, 14.8% N. | M.P.: 130° C | Dioxan tetrahydrofuran. |
| 15 | 4 hours | up to 140 | 63 | Yellow-orange oil | 3.7% B, 2.8% S, 11.1% N. | $n_D^{20}$=1.5392, $d_4^{20}$=1.150, $\eta_{20°}$=21.1 cp | Dioxan, CCl$_4$, CS$_2$. |

EXAMPLE 16

In the apparatus described in Example 6, a mixture of 103.5 g. (0.9 mol) of N-triethyl-borazane and 200 ml. of isopropyl-benzene is heated to about 135–140° C. while stirring, and then there are added dropwise within about 5 minutes 203 g. of a polymethyl-siloxane substituted by thiocyanato-methyl and having, with a thiocyanate content of 16.9 percent by weight of SCN, the approximate composition 3$Si(CH_3)_2O.14(NCS—CH_2)Si(CH_3)O.2(CH_3)_3SiO_{1/2}$ In order to complete the reaction, the reaction temperature is subsequently raised to about 155° C. for about 10 minutes, and the reaction product then worked up as described before. 214 grams of a colourless, rubber-like material are obtained, which contains 2.6% of boron, 5.3% of sulfur, 2.4% of nitrogen and 33.2±0.8% of silicon and is soluble, for example, in benzene and dioxan.

What is claimed is:

1. Process for the production of polymeric organic boron-nitrogen-sulfur compounds which comprises mixing at a temperature between about 0–600° C. borane amine having the formula $$R \rightarrow BH_3$$

in which R is a member selected from the group consisting of pyridine, alkylated pyridine, piperidine, alkylated piperidine, and primary, secondary and tertiary amines substituted with a substituent selected from the group consisting of $C_{1-18}$ alkyl, cyclohexyl, phenyl and corresponding mixtures of such substituents, with thiocyanate having the formula

in which $m$ is an integer from 1 to 6 and $p$ is an integer from 0 to 1, such that when $p$ is 0, Z is $R^4$ which is a member selected from the group consisting of alkyl, alkenyl, alkynyl, cyclohexyl, phenyl, naphthyl, and each such member which is substituted with a substituent selected from the group consisting of alkyl, phenyl, alkoxy, halo, haloalkyl, halophenyl, alkyl substituted amino, and mixtures thereof, and such that when $p$ is 1, Z is a member selected from the group consisting of alkylene, oxyalkylene, phenylene and oxyphenylene, and $R^3$ is a member selected from the group consisting of

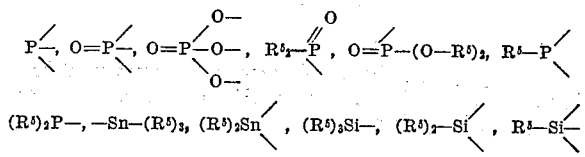

and corresponding disiloxane and polysiloxane groups having 1 to 6 free valences, in which $m$ in each instance corresponds in value to the number of free valences present in each said $R^3$ member and in which $R^5$ is a member selected from the group consisting of hydrogen, alkyl, alkenyl, phenyl, alkoxy, and phenoxy, and recovering the resultant polymeric compound.

2. Process according to claim 1 wherein said borane amine is selected from the group consisting of N-trimethyl-borazane, N-triethyl-borazane, N-tripropyl-borazane, N-tributyl borazane, N-diethyl-N-butyl-borazane, N-dimethyl-N-cyclohexyl-borazane, N-dimethyl-N-phenyl-borazane, pyridine-borine, N-diethyl-borazane, and N-lauryl-borazane, and said thiocyanate is selected from the group consisting of methylthiocyanate, ethylthiocyanate, n- and i-propylthiocyanate, n-, i- and tert.-butylthiocyanate, hexylthiocyanate, octylthiocyanate, dodecylthiocyanate, hexadecylthiocyanate, octadecylthiocyanate, methoxy-methyl thiocyanate, benzylthiocyanate, 4-chloro-benzylthiocyanate, 2-fluoro-ethylthiocyanate, 2-bromo-1-methyl-propylthiocyanate, 5,5,5-trifluoro-pentylthiocyanate, 2-methyl-2-thiocyanato-butane, 3,5,5 - trimethylhexyl-thiocyanate, allyl-thiocyanate, 3-chloro-allyl-thiocyanate, 3-ethyl-allyl-thiocyanate, oleylthiocyanate, 2-thiocyanato-butadiene-(1,3), cyclohexylthiocyanate, 4-methylcyclohexyl-thiocyanate, phenylthiocyanate, 1-naphthylthiocyanate, 3-methylphenyl-thiocyanate, 4 - dimethylaminophenyl-thiocyanate, 1,4-dithiocyanato-butene-(2), 2,3-dibromo-1,4-dithiocyanato-butane, bis-(2-thiocyanato-ethoxy)-methane, di-(2,2'-thiocyanato-ethyl) ether, di-(4,4'-thiocyanato-n-butyl) ether, trimethyl-thiocyanato-methylsilane, ethyldimethyl-thiocyanato - methylsilane, phenyl - dimethylthiocyanato-methylsilane, methoxy-dimethyl-thiocyanato-methylsilane, ethoxy-methyl-ethyl-thiocyanato-methylsilane, phenoxy-diphenyl - thiocyanato-methylsilane, trimethyl-(p-thiocyanato-phenyl) - silane, trimethyl-(α-thiocyanato-ethyl)-silane, trimethyl-(γ-thiocyanato-propyl)-silane, bis-(thiocyanato-methyl)-dimethylsilane, triphenyl-(γ-thiocyanato-propyl)-silane, triethyl-(2-thiocyanato-ethoxy)-silane, 1,3-bis-(thiocyanato-methyl)-1,1,3,3 - tetramethyl-disiloxane, heptamethyl - thiocyanato-methyl-cyclo-tetrasiloxane, trimethyl-tris - (thiocyanato - methyl)-cyclo-trisiloxane, α,ω-bis - (thiocyanato-methyl)-polymethyl-polysiloxane, tris-(thiocyanato-methyl) - phosphine, tris - (p-thiocyanato-phenyl) - phosphine oxide, tris-(p-thiocyanato-phenyl)-phosphate, diethyl-thiocyanatomethyl-phosphine oxide, p-thiocyanato-phenyl-phosphonic acid dimethyl ester, tris-(β-thiocyanato-ethyl) - phosphate, triphenyl - (γ-thiocyanato-propyl)-tin, tripropyl-(γ-thiocyanato-propyl)-tin, dibutyl-bis-(γ-thiocyanato-propyl) - tin, triphenyl - (β-thiocyanato - ethoxy)-tin, allyl - thiocyanate, 2 - thiocyanato-butadiene - (1,3) and allyl - dimethyl - thiocyanatomethyl-silane.

3. Process according to claim 1 wherein said mixing is carried out with one mol of borane amine per mol of corresponding thiocyanate group present.

4. Process according to claim 1 wherein said mixing is carried out with a mixture of such thiocyanates.

5. Process according to claim 1 wherein said borane amine is N-triethylborazane.

6. Process according to claim 1 wherein said mixing is carried out under pressure.

7. Process according to claim 1 wherein said mixing is carried out in the presence of a nitrile having the formula $$R^2(CN)_n$$

in which $R^2$ is a member selected from the group consisting of alkyl, alkenyl, cyclohexyl, phenyl, naphthyl and each such member which is substituted with a substituent selected from the group consisting of phenyl, halo, and alkyl-substituted amino, and $n$ is an integer from 1 to 6.

8. The process according to claim 7 wherein said nitrile is selected from the group consisting of acetonitrile, propionitrile, β - chloro - propionitrile, β - (N-dimethyl amino) - propionitrile, butyronitrile, octane-carboxylic acid nitrile, dodecane - carboxylic acid nitrile, hexane-carboxylic acid nitrile, N - di (β-cyanoethyl)-N-methyl amine, hexahydro - benzoic acid nitrile, benzonitrile, 2-chloro - benzonitrile, phenyl acetonitrile, naphthonitrile, malonic acid dinitrile, glutaric acid dinitrile, adipic acid dinitrile, 1,4- dicyano butene-2, cyanoform, 1,1,3,3-tetra-cyanopropane, 1,4-dicyano-butane-(2), 1,1,2,2-teracyano-ethylene, said borane amine is selected from the group consisting of N-trimethyl-borazane, N-triethyl-borazane, N-tripropyl-borazane, N-tributyl borazane, N-diethyl-N-butyl - borazane, N-dimethyl-N-cyclohexyl-borazane, N-dimethyl-N-phenyl-borazane, pyridine-borine, N-diethyl-borazane, and N-lauryl-borazane, and said thiocyanate is selected from the group consisting of methylthiocyanate, ethylthiocyanate, n- and i-propylthiocyanate, n-, i- and tert.-butylthiocyanate, hexylthiocyanate, octylthiocyanate, dodecylthiocyanate, hexadecylthiocyanate, octadecylthiocyanate, methoxy - methylthiocyanate, benzylthiocyanate, 4 - chloro-benzylthiocyanate, 2-fluoro-ethylthiocyanate, 2-bromo-1-methyl-propylthiocyanate, 5,5,5-trifluoro - pentyl - thiocyanate, 2-methyl-2-thiocyanate-butane, 3,5,5 - trimethyl-hexyl-thiocyanate, allyl-thiocyanate, 3-chloro-allyl-thiocyanate, 3-ethyl-allyl-thiocyanate, oleylthiocyanate, 2 - thiocyanato-butadiene-(1,3), cyclohexylthiocyanate, 4-methyl-cyclohexyl-thiocyanate, phenylthiocyanate, 1 - naphthyl - thiocyanate, 3-methyl-phenyl - thiocyanate, 4 - dimethylamino-phenyl-thiocyanate, 1,4-dithiocyanato-butene-(2), 2,3-dibromo-1,4-dithiocyanato - butane, bis - (2-thiocyanato-ethoxy)-methane, di-(2,2′ - thiocyanato - ethyl) ether, di-(4,4′-thiocyanato-n-butyl) ether, trimethyl-thiocyanato-methylsilane, ethyl-dimethyl - thiocyanator - methylsilane, phenyl-dimethyl-thiocyanato - methylsilane, methoxy - dimethyl-thiocyanato - methylsilane, ethoxy - methyl-ethyl-thiocyanato-methylsilane, phenoxy - diphenyl - thiocyanato-methyl-silane, trimethyl - (p-thiocyanato-phenyl)-silane, trimethyl - (α - thiocyanato-ethyl)-silane, trimethyl-(γ-thiocyanato - propyl) - silane, bis-(thiocyanato-methyl)-dimethylsilane, triphenyl - (γ - thiocyanato-propyl)-silane, triethyl - (2 - thiocyanato - ethoxy)-silane, 1,3-bis-(thiocyanato - methyl) - 1,1,3,3-tetramethyl-disiloxane, heptamethyl - thiocyanato - methyl - cyclo-tetrasiloxane, trimethyl - tris - (thiocyanato - methyl)-cyclotrisiloxane, α,ω - bis - (thiocyanato - methyl)-polymethyl-polysiloxane, tris - (thiocyanato - methyl) - phosphine, tris - (p-thiocyanato - phenyl) - phosphine oxide, tris - (p-thiocyanato - phenyl) - phosphate, diethyl-thiocyanatomethyl-phosphine oxide, p-thiocyanato-phenyl-phosphonic acid dimethyl ester, tris-(β-thiocyanato-ethyl)-phosphate, triphenyl - (γ - thiocyanato-propyl)-tin, tripropyl-(γ-thiocyanato - propyl) - tin, dibutyl-bis-(γ-thiocyanato-propyl)-tin, triphenyl-(β-thiocyanato-ethoxy)-tin, allyl-thiocyanate, 2-thiocyanato-butadiene-(1,3) and allyl-dimethyl-thiocyanatomethyl-silane.

9. Process according to claim 7 wherein said mixing is carried out with one mol of borane amine per each mol of corresponding thiocyanate and nitrile group present.

10. Process according to claim 7 wherein said mixing is carried out with a mixture of such thiocyanates and a mixture of such nitriles.

11. Process according to claim 7 wherein said borane amine is N-triethyl borazane.

12. Process according to claim 7 wherein said mixing is carried out under pressure.

13. Polymeric boron-nitrogen-sulfur compound produced according to claim 1.

14. Polymeric boron-nitrogen-sulfur compound produced according to claim 7.

15. Polymeric boron-nitrogen-sulfur-silicon compounds having the physical constants: $n_D^{20}=1.5300$, $d_{20}^4=1.007$, $\eta_{20°}=98.6$ cp., prepared by reacting N-triethyl borazane and ethyl-dimethyl-thiocyanatomethyl-silane at about 200° C.

16. A polymeric boron-nitrogen-sulfur compound having the physical constants: $n_D^{20}=1.5031$, $d_4^{20}=0.980$, $\eta_{20°}=44.7$ cp., obtained by reacting N-triethyl borazane and $C_2H_5SCN$ at about 160° C.

17. A polymeric boron-nitrogen-sulfur compound having the physical constants: $n_D^{20}=1.5374$, $d_{20}^4=1.036$, obtained by reacting N-triethyl-borazane with $$i\text{-}C_3H_7SCN$$

at about 160–180° C.

18. A polymeric boron-nitrogen-sulfur compound having a boron content of 10.8% and a sulfur content of 12.0% and a nitrogen content of 14.6%, obtained by reacting N-triethyl-borazane with $n\text{-}C_4H_9SCN$ and adipic dinitrile at about 170–180° C.

19. A polymeric boron-nitrogen-sulfur compound having a boron content of 10.9%, a sulfur content of 15.4% and a nitrogen content of 14.3%, obtained by reacting N-triethyl-borazane with $n\text{-}C_4H_9SCN$ and 1.4-dicyano-butene-(2) at about 170° C.

20. A polymeric boron-nitrogen-sulfur compound with the physical constants: $n_D^{20}=1.5280$; $d_4^{20}=1.003$, $$\eta_{20°}=26.8 \text{ cp.}$$

obtained by reacting N-triethyl-borazane with N-butyl-thiocyanate at about 130° C.

21. A polymeric boron-nitrogen-sulfur-silicon compound having the physical constants: $n_D^{20}=1.4352$, $d_4^{20}=1.005$, $\eta_{20°}=77.9$ cp., obtained by reacting N-triethyl - borazane with α,ω-bis-(thiocyanato-methyl)-poly-dimethyl-siloxane at about 150° C.

22. A polymeric boron-nitrogen-sulfur compound having the physical constants: $n_D^{20}=1.4675$, $d_4^{20}=1.034$, $\eta_{20°}=723$ cp., obtained by reacting N-triethyl-borazane with $n\text{-}C_4H_9SCN$ and $C_6H_5CH_2C\equiv N$ at about 140–160° C.

23. A polymeric boron-nitrogen-sulfur compound having the physical constants: $n_D^{20}=1.5211$, $d_4^{20}=1.025$, $\eta_{20°}=60.8$ cp., obtained by reacting N-triethyl-borazane with $n\text{-}C_4H_9SCN$ and $ClCH_2CH_2C\equiv N$ at about 150–170° C.

24. A polymeric boron-nitrogen-sulfur compound having a melting point between 235 and 237° C., obtained by reacting pyridine borazane with

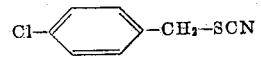

at about 100–150° C.

25. A polymeric boron-nitrogen-sulfur compound having a melting point of 135 to 138° C., obtained by reacting N-triethyl-borazane with

and $H_3C-N(CH_2CH_2C\equiv N)_2$ at about 130–160° C.

26. A polymeric boron-nitrogen-sulfur compound having the physical constant: $n_D^{20}=1.5253$, obtained by reacting N-dimethyl-N-phenyl-borazane with $$(CH_3)_2N{-}CH_2CH_2C{\equiv}N$$

and 1.3 - bis - (thiocyanato-methyl)-1.1.3.3-tetramethyl-disiloxane at about 120–140° C.

27. A polymeric boron-nitrogen-sulfur compound having the physical constants: $n_D^{20}=1.6061$, $d_4^{20}=1.2003$, $\eta_{20°}=682.3$ cp., obtained by reacting N-tributyl-borazane with

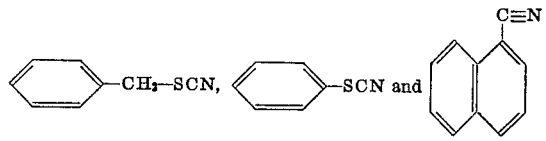

at about 125–140° C.

28. A polymeric boron-nitrogen-sulfur compound having a melting point of 130° C., obtained by reacting N-triethylborazane with $CH_2{=}CHCH_2SCN$ at about 135–175° C.

29. A polymeric boron-nitrogen-sulfur compound having the physical constants: $n_D^{20}=1.5392$, $d_4^{20}=1.150$, $\eta_{20°}=21.1$ cp., obtained by reacting N-dipropyl-borazane with

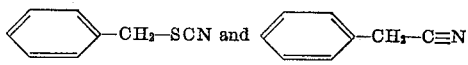

at about 140° C.

30. A polymeric boron-nitrogen-sulfur silicon compound having a boron content of 2.6% and a sulfur content of 5.3% and a nitrogen content of 2.4% and a silicon content of 33.2%, obtained by reacting N-triethyl-borazane with a polymethyl-siloxane substituted by thiocyanato-methyl groups having the proximate composition $$38Si(CH_3)_2 0.14(NCS{-}CH_2)Si(CH_3) 0.2(CH_3)_3SiO_{1/2}$$

at about 135–140° C.

References Cited
UNITED STATES PATENTS 3,238,152   3/1966   Horn _____ 260—78.4

FOREIGN PATENTS 1,000,425   8/1965   Great Britain.

DONALD E. CZAJA, *Primary Examiner.*

L. J. BERCOVITZ, *Examiner.*

M. I. MARQUIS, *Assistant Examiner.*

UNITED STATES PATENT OFFICE
CERTIFICATE OF CORRECTION

Patent No. 3,357,949                               December 12, 1967

Elmar-Manfred Horn et al.

It is hereby certified that error appears in the above numbered patent requiring correction and that the said Letters Patent should read as corrected below.

Column 3, lines 61 and 64, for "p-thiocayanto", each occurrence, read -- p-thiocyanato --; column 4, line 33, for "borazene" read -- borazane --; line 38, for "or" read -- of --; columns 7 and 8, TABLE 3, opposite Ex. 13, second column, for "50.6g.=0.4 mol." read -- 59.6g.=0.4 mol. --; column 11, line 50, for "thiocyanator" read -- thiocyanato --; column 14, line 10, for "proximate" read -- opproximate --.

Signed and sealed this 22nd day of April 1969.

(SEAL)
Attest:

EDWARD M. FLETCHER, JR.                         EDWARD J. BRENNER
Attesting Officer                                Commissioner of Patents